United States Patent
Ireland

(12) United States Patent (10) Patent No.: US 6,545,886 B1
(45) Date of Patent: Apr. 8, 2003

(54) POWER CONDITIONING FOR MODEL RAILROAD CONTROL DECODERS

(76) Inventor: Anthony J. Ireland, 97 Park Dr., Norcross, GA (US) 30071

( * ) Notice: Subject to any disclaimer, the term of this patent is extended or adjusted under 35 U.S.C. 154(b) by 0 days.

(21) Appl. No.: 09/849,542

(22) Filed: May 5, 2001

(51) Int. Cl.$^7$ .......................... H02M 7/122; H02M 7/68
(52) U.S. Cl. ................ 363/56.02; 363/56.04; 363/98; 363/132
(58) Field of Search .................. 363/56.02, 56.03, 363/56.04, 56.05, 98, 132

(56) References Cited

U.S. PATENT DOCUMENTS

| | | | | |
|---|---|---|---|---|
| 4,916,599 A | * | 4/1990 | Traxler et al. ................ 363/65 |
| 5,457,624 A | * | 10/1995 | Hastings ..................... 363/127 |
| 5,552,695 A | * | 9/1996 | Schwartz ..................... 323/271 |
| 5,847,554 A | * | 12/1998 | Wilcox et al. ............... 323/282 |
| 6,304,474 B1 | * | 10/2001 | Shinkawa ..................... 363/124 |

* cited by examiner

*Primary Examiner*—Bao Q. Vu

(57) ABSTRACT

New techniques are presented for increased power handling capability for model railroad decoders and other attached electronics when space and cooling limitations exist. Additionally, novel usage of existing electronic voltage measurements permit an improvement in Overcurrent fault detection and recovery. These techniques allow new designs with improved reliability and load current capacity.

13 Claims, 2 Drawing Sheets

POWER CONDITIONING FOR MODEL RAILROAD CONTROL DECODERS

BACKGROUND OF INVENTION

Figure 1:
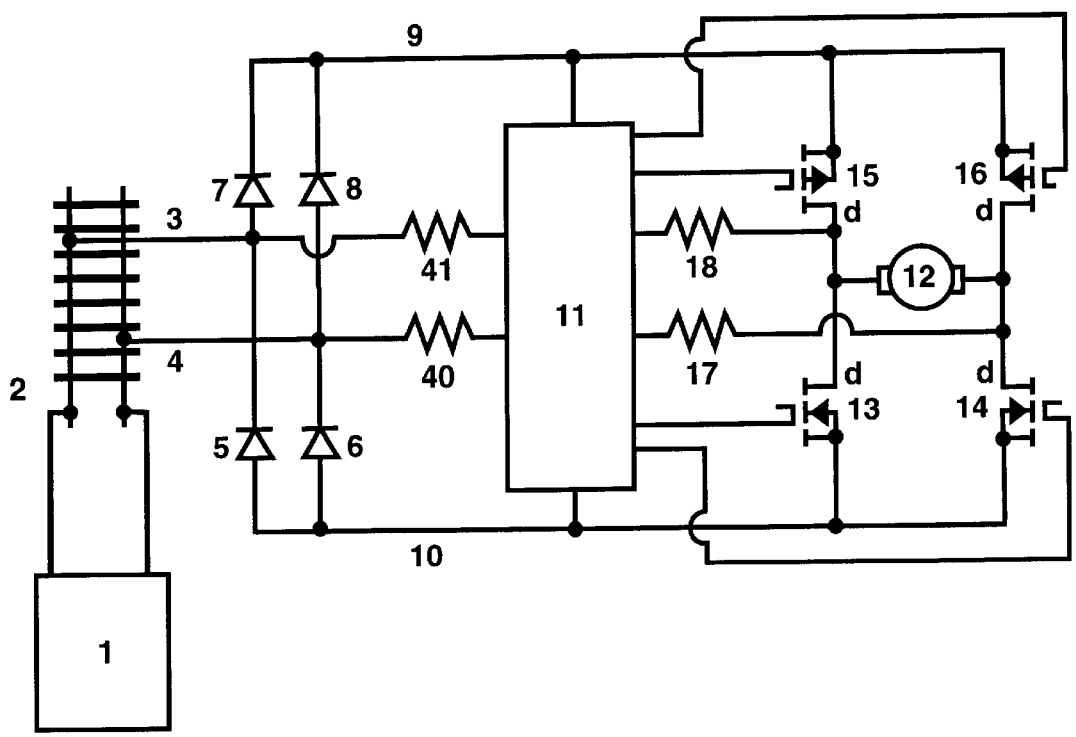

This invention pertains to the field of control systems for scale model railroad layouts, and specifically to improvements in power handling capacity of decoders used for control of elements around the layout.

Modern layout control systems allow the simultaneous control of many devices using decoder devices that are attached to or run on the tracks of model railroads. The ability to make smaller, less expensive and more reliable decoders is of great benefit, allowing the usage of the control technology in smaller railroad components and allowing greater flexibility in packaging design and installation.

The decoders derive power and control information via at least a two conductor electrical connection to the control system. This connection may be via wheel or slider pickups from the tracks, overhead catenary wires or any other conductive connection to the layout control system. The decoder analyses the encoded voltage waveform or signal conducted from this control system and, by using the information encoding rules defined for the control system, can detect and decode commands that are sent for execution or action required by the decoder.

Since the decoders may be connected in either orientation or polarity to the control system, they require an input rectifying full bridge arrangement to ensure a consistent and predictable voltage polarity can be extracted from the encoded voltage waveform when connected either way. This input rectifying full bridge carries the load current that the decoder then supplies in a switched or modulated manner, using additional power control elements, to a controlled load such as motors or lamps. The internal power control components of the decoder require an unvarying polarity inside to the decoder to operate correctly.

Additionally, the voltage encoding waveforms employed by some control systems may appear as a bipolar, or continuously alternating polarity, voltage waveform at the decoder. This then mandates the inclusion of a rectifying full bridge (also known as full wave bridge) at the input to condition the voltage waveform so it can be used by the decoder to power attached controlled loads such as motors, lamps or actuators.

Practical rectifying full bridge implementations typically include four semiconductor power diodes arranged in the full bridge rectifier configuration well known to those skilled in the art of electronic circuit design. In operation, the full bridge diode components experience a voltage drop in the forward voltage direction when conducting current. This forward voltage drop occurs while the diodes are conducting the full load current and so can represent a significant power loss. To minimize this power loss in a decoder, it is usual to use high quality and low forward voltage drop diodes, such as schottky barrier diodes. These devices represent the best conventional devices that can and have been used in prior art decoder designs.

The heat generation by the input rectifying full bridge imposes fundamental limits to the size and current control capacity of a decoder. As decoder designs strive for miniaturization the overall surface area decreases and consequently the heat dissipation capability also decreases. For a given amount of heat generation due to load current, decreased dissipation capabilities leads to increased internal temperatures and consequently lower long-term reliability.

The fill bridge is the limiting device in the decoder design because the other power switching devices can take advantage of power switching devices, such as MOSFETs selected for very low losses and negligible voltage drops, at the current levels in use. Conventional rectifiers always have a minimum forward conduction voltage and losses.

To allow for a breakthrough in decoder miniaturization and increased current capacity a new and novel approach is required.

The key breakthrough is to discard prior art and to reconfigure the full bridge rectifier function with a new circuit topology hitherto unused in model railroad decoder design practices.

State of the art designs in high-energy switching power supplies, such as the design shown by Schwartz in U.S. Pat. No. 5,552,695, sometimes employ the unique conduction characteristics of metal-oxide-silicon field effect transistors, or MOSFETS, operating in their third-quadrant conduction mode. This is sometimes generically referred to as "synchronous rectification". This mode takes advantage of the MOSFET's ability to conduct significant reverse current at a low voltage drop when the source to drain terminals are reverse biased while the gate to source terminals are forward biased or on. This technique is used to improve the efficiency of the power supply at high currents and low output voltages, since rectifier power losses are reduced and are a smaller percentage of the output voltage. Herein the term "third quadrant" is taken to mean the operation of a MOSFET with drain to source terminals in reverse bias whilst the gate to source terminals are biased on.

Synchronous rectifier designs are commonly limited to half wave, series-parallel or forward-flyback rectifier configurations at the power supply inductive energy storage node or output node, since all commercial design arrangements operate with a fixed power supply output connection polarity. Here, a full bridge configuration is redundant or impractical and would have twice the components and losses on the minimally sufficient half-wave design. The ac power line input to the power supply cannot practically use a synchronous full wave bridge because suitable device ratings are unavailable at these voltage levels, or are prohibitively expensive. Also the reduction of forward voltage from, for example 0.75 Volts to about 0.3 Volts represents a negligible efficiency saving on a switched voltage of several hundred volts or more. For these reasons wholly synchronous rectifier full wave bridges have not been practically required or used to date.

MOSFETs have a parasitic or intrinsic body diode between the source and drain terminals that is off, or reverse-biased, in normal first-quadrant operation. When the MOSFET source and drain terminals are reverse biased with a zero volt gate bias, this intrinsic body diode will conduct, but this body diode operates with similar voltage drops or losses to high speed non-schottky diodes, and is unsatisfactory for efficient operations. An example of this low efficiency usage of MOSFET body diodes for rectification is the Lenz Electronics LE077XF model locomotive decoder, a circa 2000 era design. Here two six pin devices, each containing two MOSFETs with zero gate-bias, provide four independent body diodes connected conventionally as a full rectifier bridge. This design is employed to provide a full rectifier bridge in a small space, but fails to obtain the advantage of the insight or innovation of using these same devices for high efficiency third quadrant MOSFET operation.

While in reversed drain to source bias and the body diode conducting, the application of a forward, or on, instead of zero bias voltage to the MOSFET gate will induce a current carrying mode with a significantly lower voltage drop than the body diode or even schottky diodes. In operation, a low Rds(on) or high current MOSFET used as a third-quadrant rectifier can typically have losses of 25%, or less, of even the best conventional schottky rectifiers. For example, the voltage losses at load may be in the range of 0.1 Volts to 0.2 Volts for an N-channel MOSFET as a third quadrant rectifier, where a schottky rectifier would be approximately in the range of 0.55 Volts to 0.7 Volts at the same device die size and ratings in forward conduction mode.

Conventional power switching designs stringently avoid the use of P-channel MOSFETs, since the manufacture of these devices necessarily yields performances of about half of the equivalent N-channel devices. Designers go to great lengths to arrange circuit topologies to allow for N-channel devices whenever possible. For this reason, there are no prior decoder full rectifier bridge designs employing complementary N and P-channel MOSFETs in a full bridge design that employ high efficiency third quadrant techniques. The recently introduced Lenz LE010XF decoder in fact is a rare instance of the use of complementary N and P-channel devices in a full bridge, but again this design employs a zero gate bias on the MOSFETs, so is clearly not a third quadrant design.

An additional issue that good decoder designs need to consider is protection of the typical power devices used in a complementary H-bridge output to drive a DC motor.

Contemporary designs typically use two N and two P-channel MOSFETs in the well known H-bridge configuration to provide a reversible conduction path to control a DC motor in both forward and reverse directions. The installation and operation of the decoder by an unskilled user may easily result in circumstances that readily overstress or damage a decoder, most often the motor control H-bridge. The common faults are; inadvertent connection of one or both of the motor leads to a layout power connection, using a motor and mechanism with an excessive current draw, or the shorting of the motor leads due to poor wiring or insulation techniques. These connection flaws may destroy a decoder if not promptly detected in installation or operation.

Decoders may sense the motor voltages on both leads of the DC motor when the H-bridge is non-conducting to see if an incorrect or parasitic connection to another source of power is present. This represents an efficient capability and implementation.

Additionally a current sense resistor may be used in the motor circuit to see if during a H-bridge conduction phase that the motor current does not exceed a preset limit. The current sense resistor is typically bulky and can develop a excess heat at full motor load. An example of this would be the contemporary Zimo Electronics MX61 decoder that uses 0.22 ohm resistors to sense the motor load current, and also separately samples the motor back-emf for load compensation.

The on resistance of the typical H-bridge low-side N-channel MOSFETs is well characterized by device grading and manufacturer specification. In fact, it is possible to use this on resistance of these MOSFETs to sense the load current of the motor by sensing the voltage drop when ON, since one of these devices is typically always ON when the DC motor is operating in either direction. The decoder already employs voltage sensing connections to either side of the DC motor to check for motor safety isolation, as noted earlier. These same voltage samples are also used in some designs to sample the back-emf of the motor when it is coasting, to allow for load sensitive speed compensation by the decoder. Since the infrastructure for motor voltage detection is already in the design for other compelling reasons, it is a novel and useful extension to use the same voltage samples in new way so as to detect if the load current is excessive. This provides a useful and very compact design capable of giving comprehensive H-bridge protection at no extra cost and component count. The MOSFET current sense voltage is strongly influenced by die temperature, with an approximate change of +60% in voltage going from 25 to 150 degrees Celsius device temperature. This is actually beneficial since a an overheating decoder, due to poor installation and heat removal, will appropriately reach an Overcurrent decision earlier than a decoder in good heat removal conditions. In fact the die temperature is the fundamental limit to semiconductor safe operating levels, not a particular current level, so this method of Overcurrent detection has the benefit of jointly screening for adverse temperature conditions as well as absolute operating current.

Wilcox in U.S. Pat. No. 5,847,554 uses MOSFET on resistance and associated load current voltage drop to sense the correct inductive charging current and switch point for a step-down buck voltage converter. This is a completely different application of the voltage sensing effect, since this is not a decoder H-bridge and the sensed MOSFET device is not in continuous conduction. This is a completely different configuration than found in a decoder, but indicates the usefulness of current sensing by this method. Wilcox also cites overload protection by this method, but this is also different from that obtained in this invention since the Wilcox load current and converter duty cycle are modified from an inferred load current condition, because a significant inductive reactance exists between the actual MOSFETs and load and isolates this load. In the decoder H-bridge case, the load current is directly sensed with no protective or isolating impedance between the MOSFETs and load. The usage of sensed voltages is significantly different in topology and design in this invention. MOSFET on state voltages have been used prior to Wilcox in many designs for current sensing of power switches.

The value of this invention is the incorporation of this current sense method into an existing decoder design, by realizing that all the required hardware elements are in fact in place and recognizing that correct usage of the existing information provides a considerable new benefit.

SUMMARY OF INVENTION

Shrinking the physical size of conventional decoder designs using the prior art leads to configurations where full bridges implemented with low efficiency rectifier devices limit the available miniaturization because of thermal limitations.

Improvements in power management efficiency of full bridge rectifiers described in this invention allow creation of decoders with improved current capacity and reliability, in a smaller size.

Evaluation of voltage samples from the H-bridge motor output terminals allows the decoder to sense current overload and temperature sensing conditions with no additional hardware requirements.

All these improvements disclosed herein are best employed in a single decoder design, but may also be employed separately as required.

ATTACHED DRAWINGS: (2 sheets)

FIG. 1 details the typical circuit arrangement of prior decoder design art

Figure 2:
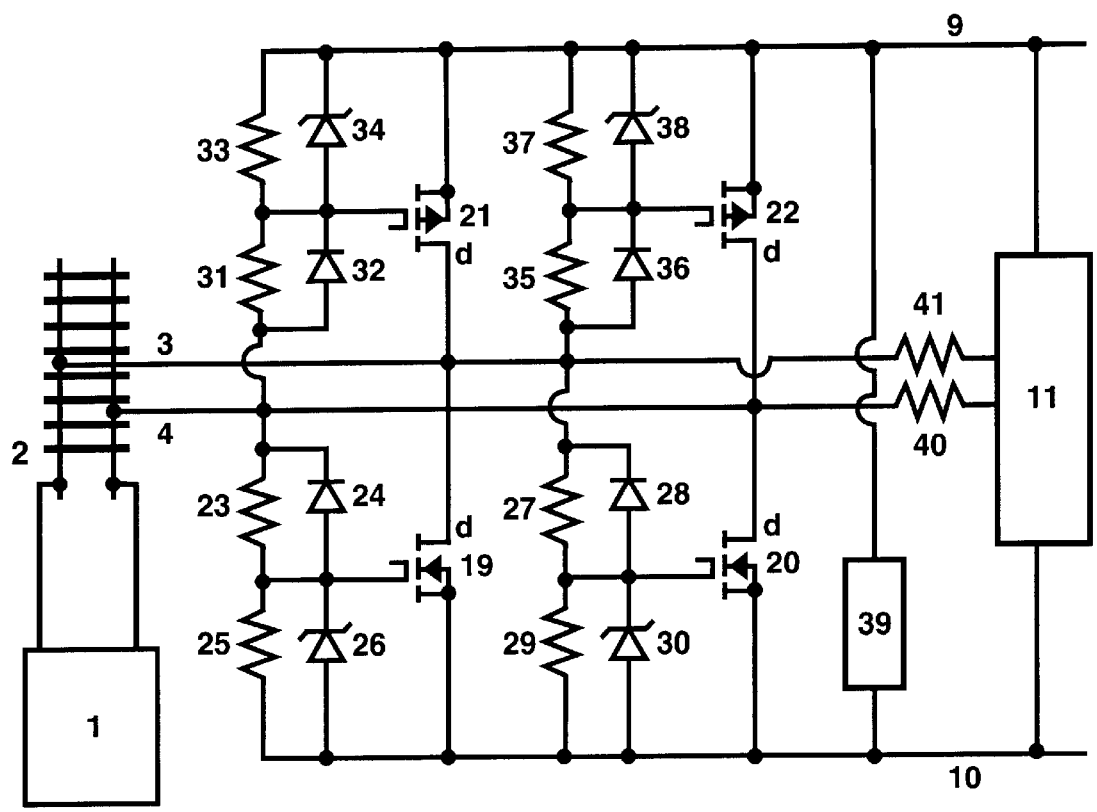

FIG. 2 show the schematic of an improved full bridge design

DETAILED DESCRIPTION OF INVENTION

FIG. 1 depicts the key elements of a typical decoder designed using prior art. Item 1 represents the power driving, or output, stage of a control system that supplies encoded voltage waveforms that are conducted to a model railroad layout, 2, to control devices connected to the layout.

Items 5 through 18 represent many important elements incorporated into a prior art decoder design. Items 3 and 4 represent the power input connections from the decoder to the track or layout, 2, and system. These input connections may be wheel pickups or even a directly wired connection. Items 5 and 6 represent two rectifier diodes that conduct current as the negative bridge output to the internal decoder negative node, 10.

Node 10 is typically the reference point for voltage and polarity for the decoder and also this commentary. Items 7 and 8 represent two rectifier diodes that conduct current as the positive bridge output to the internal decoder positive node, 9. These four items 5,6,7,8 are shown as conventional diode symbols where the bar represents the cathode or negative end of the devices when conducting, and these four items constitute a conventional full bridge rectifier design.

Item 11 represents a control module arrangement for the decoder. Inside this module are all the required electronic elements and associated control software to animate the decoder and to interface the internal control voltages to the decoder input and output control lines. The explicit arrangement of components within the control module is not shown here, since that is not required for analysis of this invention, but is reduced to a defined functional module.

Items 40 and 41 represent the input voltage detection means to the control module that permit the control software to detect the voltage waveforms conducted to the decoder by connections 3 and 4. The control software may measure the actual voltage levels or detect encoded information from the timing transitions of the input voltage waveforms, as defined for the actual control encoding method that is being employed. These control encoding methods allow the decoder to determine the action commanded by the control system from a user, and for example change the speed or direction of an attached dc motor.

Items 13 and 14 represent N-channel MOSFET devices with their control gates driven appropriately by signals from the control module. The N-channel source terminals are connected to the internal negative node, 10, and the N-channel drain terminals, denoted with a small "d", are connected to either side of a DC motor load, 12. Items 15 and 16 represent P-channel MOSFET devices with their control gates driven appropriately by signals from the control module. The P-channel source terminals are connected to the internal positive node, 9, and the P-channel drain terminals, denoted with a small "d", are also connected to either side of a DC motor load, 12. These four items 13,14,15 and 16 combine to form a widely used H-bridge configuration capable of bipolar motor drive.

In normal operation voltage is conducted to the motor, 12, by enabling the conduction of the MOSFET pair 13 and 16 for one motor direction or by enabling the conduction of the MOSFET pair 14 and 15 for the opposite motor direction. This is a conventional H-bridge design for the bipolar control of a DC motor speed and direction. The motor speed may be controlled by duty cycle modulation of the period when the active P-channel device is conducting. During the time the active P-channel device is off the N-channel paired device connected to the other side of the motor remains conducting. This sequence is employed to ensure that any inductive energy stored in the motor's magnetic fields that is dumped when the P-channel MOSFET ends conduction is clamped to the negative node, 10, and does not cause a voltage transient on the internal positive node 9. This voltage clamp occurs when the positive voltage to the motor is interrupted by the P-channel device ending conduction, leading to the motor inductance reversing the motor terminal polarity and forcing the effective motor terminal voltage negative. The other non-conducting N-channel device has an intrinsic body diode that conducts when this negative voltage occurs and clamps the inductive current kickback to a diode drop below the negative node, 10. This controlled conduction sequence for the H bridge devices is important to ensure that no high voltage transients are created when the motor load current is switched through its inductance in normal operation. Of course, it is possible to swap the control logic and voltage sensing of the N and P-channel MOSFETs so the duty cycle modulation is applied to the N-channel device while the paired P-channel device remains ON. This is an implementation issue that does not change the functional operation of the H-bridge and control and measurement strategy to be employed.

Items 17 and 18 are H-bridge output voltage sense means that may be used by the control module to sample the motor back-emf or "coasting" generator voltage when the associated active P-channel device becomes non-conducting. For example, if the P-channel device 15 has just been made non-conducting, while paired device 14 remains conducting, then after the inductive kickback has been clamped by non-conducting item 13, the voltage on the motor terminal sensed by item 18 tends to a voltage proportional to the motor speed. This allows for the possibility of the decoder to sense increased motor load and to adjust the duty cycle modulation to automatically compensate for speed fall-off when, for example, a locomotive encounters a hill or other gradient change on the layout.

The previous has covered the key points of the operation of prior art decoder designs.

The preferred embodiment of the invention is shown in FIG. 2. Here the rectifier diodes 5,6,7,8 of FIG. 1 are functionally replaced by two N-channel MOSFETs, 19 and 20, and two P-channel MOSFETs 21 and 22, along with four instances of third quadrant operation gate voltage control items, 23 to 38, which are the means used to force all the rectifier MOSFETs into third quadrant operation. Items 23,24,25 and 26 would represent a single instance of third quadrant operation gate voltage control means that controls just MOSFET 19.

To realize a third quadrant MOSFET configuration usable for the input power bridge in decoder designs it is necessary to employ at least four MOSFET devices as shown in FIG. 2. Two N-channel polarity MOSFET devices, 19, 20, are needed for carrying the input current out the decoders' internal negative node 10, and two P-channel polarity MOSFETS, 21, 22 are used to carry the input current into the decoders' internal positive node, 9. The current direction here is in the "conventional" sense of flowing from positive to negative, not actual electron flow. Note that although only the minimum two pairs of MOSFETs are shown, it is reasonable to parallel connect additional MOSFETS of matched polarity across any or all of items 19,20,21 and 22 to obtain the benefit of further reduced voltage drops. This is due to parallel resistances yielding lowered overall resistance, and increases the current capacity in any one of the four bridge conduction paths beyond that of a single device.

The additional third quadrant operation gate voltage control items, 23 to 38, appear to add a lot of complexity, which is another reason that the advantages of third quadrant operation have been ignored prior to this invention. On close inspection, it will be noted that these third quadrant operation gate voltage control items can be physically small, inexpensive and do not generate much heat.

Overall, the reduction of decoder heating due to lowered rectifier bridge voltage drops fully justifies this novel decoder configuration of higher complexity.

The operation of the N-channel device 19 is equivalent to diode item 5 of FIG. 1. The body diode of item 19 corresponds to the diode, 5, with the respective anodes connected to the negative nodes, 10. Current is conducted when the voltage of input connection 3 is more negative than 10 for both figures. To obtain the benefit of third quadrant operation when MOSFET 19 drain terminal and also connection 3 is negative with respect to node 10, a positive or ON gate bias must be applied to the gate terminal of MOSFET 19. Item 23 is an impedance that is used to conduct a positive voltage from the, now conveniently positive, input connection 4 to the gate of MOSFET 19. This ensures that we bias MOSFET 19 into proper low-loss third quadrant operation for this applied voltage condition. MOSFET 21 operates in a complementary manner to 19 and is connected to input connection 3. Obviously, if we operate the full bridge MOSFETs at zero gate bias then we will have a full bridge composed solely of body diodes, and not be able to take advantage of the improved efficiency of having all the bridge MOSFETs in third quadrant operation.

Item 25 is an optional extra impedance that may be used in conjunction with 23 to divide down the full input voltage from connection 4 to some lower level that may be more compatible with the maximum gate voltage allowed on MOSFET 19, whilst still allowing a sufficient gate turn-ON voltage to operate efficiently in the third quadrant. Note that dividing the input voltage range in this way also allows the conduction crossover range, when bridge MOSFETS can pass short circuit current directly from connections 3 to 4, to a reduced voltage range and time since the gate voltage requires less voltage change to return to the off state.

Alternatively to item 25, or in conjunction with it, the zener diode represented as item 26 may be employed as shown in the circuit of FIG. 2 to limit the gate voltage to a safe positive value. These three items 23, 25 and 26 are employed for the turn-ON positive voltage application to gate of MOSFET 19. Other solid-state multi-terminal devices designed for MOSFET gate control may be employed to perform this task, but essentially perform the same function and are equivalent to the preferred embodiment shown here.

The speed of the turn ON of MOSFET 19 is not especially critical. For the period that the MOSFET 19 is not in true third quadrant operation with a positive or ON gate voltage, the body diode will conduct the load current properly, albeit with a higher loss or voltage drop than when the gate is biased ON. This is a very small loss of efficiency, since most practical delays are only a very small fraction of the conduction period of the device.

In fact it is useful for the MOSFET to turn ON more slowly than the input waveform changes polarity, since this minimizes the magnitude of short circuit current if conduction crossover occurs between the MOSFETs in the bridge.

Impedance item 25 is represented as a resistor symbol in FIG. 2, but actually may be alternatively implemented as a capacitive reactance. This may be employed if there are fast changing transients on the track system or decoder wiring, and a capacitance realization of item 25 will desensitize the MOSFET from falsely turning ON with high slew rate or dV/dT transient events on the track connections, due to the gate to drain Miller-effect capacitance being bypassed to the MOSFET source by 25. Item 25 being a capacitor may also be used to advantage in conjunction with item 23 to additionally slow down the turn ON of the MOSFET. If item 23 is chosen as a high enough impedance, then the input capacitance of the MOSFET gate also acts to slow down MOSFET turn on time to allow for slowly changing input waveforms to be used with this full bridge configuration. Obviously if we need item 25 as a resistance for division reasons then an extra capacitance element may be added across 25 if capacitance is also required.

Using encoded voltage control waveforms that change polarity frequently, for example every 30 to 50 microseconds, poses a particularly important challenge to ensure that any MOSFET exits ON biased third quadrant mode to OFF biased, or current blocking, first quadrant operation as fast as the polarity reversal of connections 3 and 4 occurs. For digital control waveforms commonly used for model layout control, the actual polarity reversal will occur as quickly as one to several microseconds. If MOSFET 19 exiting third quadrant operation does not have a turned-off state of gate bias when input connection 3 reverses to a positive voltage (with respect to node 10), then a short circuit will exist from 3 to 4. This path is via at least the body diode of MOSFET 20 through MOSFET 19, which is now operating as first quadrant ON until its gate bias is off. For this reason item 24, a fast acting diode, is required to ensure that the gate of MOSFET 19 has a high-speed discharge path to the low impedance input connection 4, which when changing to a negative voltage, turns off MOSFET 19 rapidly. The quick gate turn off for a MOSFET exiting from third quadrant operation is vital and critical to correct operation of this invention in any embodiment.

The complementary polarity of N-channel MOSFETs 19, 20 and P-channel MOSFETs 21, 22 are required to implement a proper full bridge design. Item 20 operates in exactly the same manner as item 19, but conducts the current from node 10 to connection 4 in opposite track voltage cycles or phase to item 19, which conducts current to connection 3. Thus items 19 and 20, in conjunction, ensure continuous current flow from node 10. The P-channel devices 21, 22 operate in a complementary way but the same logical manner as the N-channel devices 19, 20 except that the drain to source and gate to source terminal voltages are reversed polarities. These two P-channel devices act in conjunction to conduct current from connection 3 (via 21) and connection 4 (via 22) to the internal positive node 9.

The optional zener diodes 26,30,34 and 38 protect the MOSFET gates from possible over voltage stresses. It is possible to add a single voltage limiting device, 39, such as a zener or varistor to the output of the full bridge . This allows the gate protection zeners to be eliminated, since an input voltage transient is clamped by the bridge output voltage limiter, 39, and we know that no gate voltage can exceed the voltage at associated nodes 9 or 10 by more than the body diode drop of any of the MOSFETs. In this manner items 25, 29, 33 and 37 may be resistors appropriately chosen so as to then attenuate this clamped voltage to then be within the gate ratings of the MOSFETs. Appropriate MOSFETs for this invention are selected for; lowest on resistance at the expected operating gate voltages, sufficient current and thermal capacity and adequate off state withstanding voltage.

Items 17 and 18 of FIG. 1 are H-bridge output voltage sense means to allow sensing of the motor terminal voltages, and are typical for decoder designs that sense motor isolation when the H-bridge is off, and also allows sampling of the motor back-emf. The back-emf range is typically up to 60% to 80% of the full speed motor voltage, depending on the efficiency of the motor operating as a generator. This means that the control module, 11, needs to be configured to measure and evaluate voltages from connections 17 and 18 of about 8 volts to 16 volts at the motor. The devices used to implement 17 and 18 are typically resistances which in conjunction with other elements contained within control module 11 set the voltage detection ranges. This voltage evaluation may be via analog to digital converter, voltage to frequency converter, comparators or other conversion or voltage measurement technique. The conversion resolution is chosen to allow adequate speed control accuracy for back-emf designs.

When items 14 and 15 are both turned ON, load current flows and the motor is driven in a particular direction. During the time that the load current flows item 17 in fact senses the load current induced voltage drop across device 14. This voltage is typically in the range of tens of millivolts to hundreds of millivolts depending on load current, MOSFET on resistance and die temperature. It is straightforward to provide sufficient resolution in the voltage evaluation device at this low voltage to set a threshold decision voltage that the control module, 11, can use to decide if the load current is excessive and that a motor fault may be assumed. This action may be used to turn off and protect the decoder H-bridge. The benefit of this arrangement is that a separate current sense resistance is not needed and this saves cost, physical layout space and heat generation. This is an efficient and novel extra usage of sense voltages already provided to the control module for other purposes. When the motor now operates in the other direction items 13 and 16 are both ON and item 18 may be used in the same manner as already described to sense if the load current is also excessive.

The overall current usage of the whole decoder may also be monitored in a similar manner by using the input voltage detection voltages sampled by items 40 and 41. These two input voltages are normally used to detect the commands from the control system. If the control module 11, also employs voltage conversion on these sampled input voltages then it is also possible to determine the current that is being conducted by the full bridge MOSFETs to the whole decoder. Note that the most useful voltages are sampled by 41 when 3 is negative with respect to node 10 and 19 is conducting or when 4 is negative and 20 is conducting and sampled via 40. These voltages will actually be negative with respect to the negative reference 10 and the conversion method needs to encompass this below ground input range. Also the voltage sampling needs to be synchronized with the voltage transitions on the connections 3 and 4, and a valid measurement will be negative and in the range of tens to hundreds of millivolts.

The techniques presented herein are not limited to just decoders on model railroads. It is possible to use the full bridge configuration and current sense and protection method shown in other control electronics used around the model railroad. In these other control electronics the important elements of this invention are realized in an essentially equivalent manner to those shown herein and allow the creation of the same capabilities albeit with slight differences in implementation but capture the essential nature of this preferred embodiment.

What is claimed:

1. A method for creating a full bridge rectifier in a model railroad decoder comprising at least;
    a) providing a multiplicity of N-channel MOSFET means connected between both power inputs and negative output of said full bridge rectifier,
    b) providing a multiplicity of P-channel MOSFET means connected between said both power inputs and positive output of said full bridge rectifier,
    c) providing third quadrant operation gate voltage control means for said multiplicity of said N-channel MOSFET means and said multiplicity of said P-channel MOSFET means that includes at least a component to assure fast MOSFET turn off,
configuring said full bridge rectifier for minimum operating heat generation and highest current capacity in said model railroad decoder.

2. The method defined in claim 1 wherein said component to issure fast MOSFET turn off is a diode means.

3. The method defined in claim 1 wherein said third quadrant operation gate voltage control means includes at least a component to protect the gate terminals of said multiplicity of said N-channel MOSFET means and said multiplicity of said P-channel MOSFET means from damaging voltages.

4. The method defined in claim 1 wherein said third quadrant operation gate voltage control means includes at least a voltage dividing means to establish the optimum operating voltages to the gate terminals of said multiplicity of said N-channel MOSFET means and said multiplicity of said P-channel MOSFET means.

5. The method defined in claim 1 wherein said third quadrant operation gate voltage control means includes at least a component to protect the gates of said multiplicity of said N-channel MOSFET means and said multiplicity of said P-channel MOSFET means from false conduction due to spurious noise impulse voltages conducted to said fill bridge rectifier.

6. The method defined in claim 1 wherein said third quadrant operation gate voltage control means includes at least a component to slow down the turn on time of said multiplicity of said N-channel MOSFET means and said multiplicity of said P-channel MOSFET means to minimize conduction crossover short circuit current.

7. The method defined in claim 1 wherein the addition of input voltage detection means permits control module means to measure load current of said full bridge rectifier providing current monitoring capability.

8. A method for current sensing of an H-bridge configuration comprising at least;
    a) providing said H-bridge configuration wherein the MOSFET voltage drop across a conducting MOSFET member of said H-bridge configuration is approximately proportional to load current of said H-bridge configuration,
    b) providing an H-bridge output voltage sense means to measure said MOSFET voltage drop,
    c) providing a control module means for processing the output of said H-bridge output voltage sense means,
whereby said processing of said MOSFET voltage drop allows said control module means to detect said load current of said H-bridge configuration.

9. The method defined in claim 8 wherein said load current detected by said control module is used to determine that an output fault exists, allowing said control module to act to protect said H-bridge from damage.

10. A method for creating a full bridge rectifier in a model railroad electronic device that is not a decoder, comprising at least;
   a) providing a multiplicity of N-channel MOSFET means connected between both power inputs and negative output of said full bridge rectifier,
   b) providing a multiplicity of P-channel MOSFET means connected between said both power inputs and positive output of said full bridge rectifier,
   c) providing third quadrant operation gate voltage control means for said multiplicity of said N-channel MOSFET means and said multiplicity of said P-channel MOSFET means that includes at least a component to assure fast MOSFET turn off,
configuring said full bridge rectifier for minimum operating heat generation and highest current capacity in said model railroad electronic device that is not a decoder.

11. The method defined in claim 10 wherein said component to assure fast MOSFET turn off is a diode means.

12. The method defined in claim 10 wherein said third quadrant operation gate voltage control means includes at least a component to slow down the turn on time of said multiplicity of said N-channel MOSFET means and said multiplicity of said P-channel MOSFET means to minimize conduction crossover short circuit current.

13. The method defined in claim 10 wherein the addition of input voltage detection means permits control module means to measure load current of said full bridge rectifier providing current monitoring capability.

* * * * *